(12) United States Patent
Whiteman et al.

(10) Patent No.: US 10,011,236 B2
(45) Date of Patent: Jul. 3, 2018

(54) TIRE TREAD COLLECTION DEVICE

(71) Applicant: Road Gator Wrangler, LLC, Fernandina Beach, FL (US)

(72) Inventors: Timothy M. Whiteman, Fernandina Beach, FL (US); Charles M. Whiteman, Roswell, GA (US)

(*) Notice: Subject to any disclaimer, the term of this patent is extended or adjusted under 35 U.S.C. 154(b) by 0 days.

(21) Appl. No.: 15/677,597

(22) Filed: Aug. 15, 2017

(65) Prior Publication Data
US 2018/0072234 A1    Mar. 15, 2018

Related U.S. Application Data

(60) Provisional application No. 62/385,496, filed on Sep. 9, 2016.

(51) Int. Cl.
*B60R 9/06* (2006.01)

(52) U.S. Cl.
CPC .................... *B60R 9/06* (2013.01)

(58) Field of Classification Search
CPC .... B62D 25/16; B62D 25/163; B62D 25/168; B62D 25/18; B62D 25/182; B62D 25/161; B60R 9/06
See application file for complete search history.

(56) References Cited

U.S. PATENT DOCUMENTS

| | | | | |
|---|---|---|---|---|
| 2,746,507 A * | 5/1956 | Morgan | ............... | B60C 27/145 152/212 |
| 4,124,221 A * | 11/1978 | Goings | ............... | B62D 25/188 280/851 |
| 4,417,741 A * | 11/1983 | Ciocan | ............... | B62D 25/168 248/201 |
| 5,566,420 A * | 10/1996 | Specht | ............... | A46B 7/023 15/256.5 |
| 5,967,554 A * | 10/1999 | Rea | ............... | B62D 25/168 280/851 |
| 7,669,798 B2 * | 3/2010 | Guering | ............... | B62D 25/168 244/100 R |
| 9,296,268 B2 * | 3/2016 | Smith | ............... | B60C 27/145 |
| 2013/0067667 A1 * | 3/2013 | Hopkins | ............... | E01H 1/106 15/78 |

* cited by examiner

*Primary Examiner* — Brian L Swenson
(74) *Attorney, Agent, or Firm* — PatentFile, LLC; Bradley C. Fach; Steven R. Kick

(57) ABSTRACT

In some embodiments, a tire tread collection device is provided which may be coupled to any vehicle preferably having one or more tires. The device may include one or more vertical supports which may be coupled to a debris screen. The debris screen may have a first end, with a collection aperture, and a second end. The first end and collection aperture may be positioned behind and proximate to one or more tires of a vehicle. Preferably, the device may include a first vertical support and a second vertical support which may each be coupled to opposite sides of the collection aperture and which may also be coupled to an opposing side of the vehicle so that one or more tires are positioned approximately between the vertical supports. Tire debris thrown from the tires may enter the debris screen through the collection aperture of the first end and be retained therein between the first end and the second end.

19 Claims, 7 Drawing Sheets

TIRE TREAD COLLECTION DEVICE

CROSS REFERENCE TO RELATED APPLICATIONS

This application claims priority to and the benefit of the filing date of U.S. Provisional Application No. 62/385,496, filed on Sep. 9, 2016, entitled "TIRE TREAD COLLECTION DEVICE", which is hereby incorporated by reference in its entirety.

FIELD OF THE INVENTION

This patent specification relates to the field of tire tread catching devices. More specifically, this patent specification relates to a device which is configured to be secured to a wheeled vehicle or trailer and to collect debris common to roadways. The device is configured to catch the tire debris, such as from a semi truck trailer blowout, or any roadway debris kicked up by a truck or its trailer.

BACKGROUND

Semi truck trailers most commonly have two or more axles with two or more tires that are attached in pairs on each side of the axles. Typically, the axles are positioned on the bottom of the trailer. The axle closest to the back of the trailer is generally five to seven feet from the rear of the truck, although this distance can vary greatly by trailer type. New tires and retread tires on trailers frequently lose tire tread. The thrown tread can end up on the road surface as tire debris which can cause traffic problems from drivers attempting to avoid colliding with the tire debris. These traffic problems may result from a collision with another vehicle or damage to a vehicle from a tire debris impact. For this reason, there have been highway accidents with injuries and/or death attributed to tire debris, which could have been prevented. Aside from the safety concerns, tire debris is detrimental to the environment and detracts from the aesthetic appeal of roadways.

Therefore a need exists for a novel tire tread catching device which is able to reduce the amount of semi truck trailer tire tread debris on roadways. There is also a need for a novel tire tread catching device which is able to decrease traffic problems from drivers attempting to avoid colliding with tire debris. A further need exists, for a novel tire tread catching device which is able to decrease the likelihood of damage to a vehicle from a tire debris impact. Finally, a need exists for a novel tire tread catching device which is able to decrease the number of accidents, injuries, and deaths attributed to roadway tire debris.

BRIEF SUMMARY OF THE INVENTION

A tire tread collection device is provided which may be coupled to any vehicle preferably having one or more tires and a preferably a frame, such as a semi truck trailer and/or a truck tractor. In some embodiments, the device may include a first vertical support configured to be coupled to the vehicle and a second vertical support configured to be coupled to the vehicle. A debris screen may be coupled to each of the first vertical support, the second vertical support, and to the frame of the vehicle. The debris screen may include a collection aperture bounded by the first vertical support, the second vertical support, and the frame of the vehicle. Preferably, the first vertical support and second vertical support may each be coupled to opposite sides of the collection aperture and each vertical support may also be coupled to an opposing side of the vehicle so that one or more tires may be positioned approximately between the vertical supports. Tire debris may enter the debris screen through the collection aperture to be retained within the debris screen.

In further embodiments, the device may comprise one or more vehicle couplers and each vehicle coupler may be configured to couple a vertical support to a portion of the vehicle, such as to a portion of the frame or to a mud flap hardware of the vehicle.

In further embodiments, the collection aperture may be shaped to have a width that is greater than the width of at least one tire of the vehicle.

In still further embodiments, the device may include one or more optional horizontal supports which may be coupled to one or more vertical supports. A horizontal support may be coupled anywhere to the debris net, such as by being coupled to the bottom of the collection aperture, so that the shape of the collection aperture may be maintained by the vertical supports and the horizontal support.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
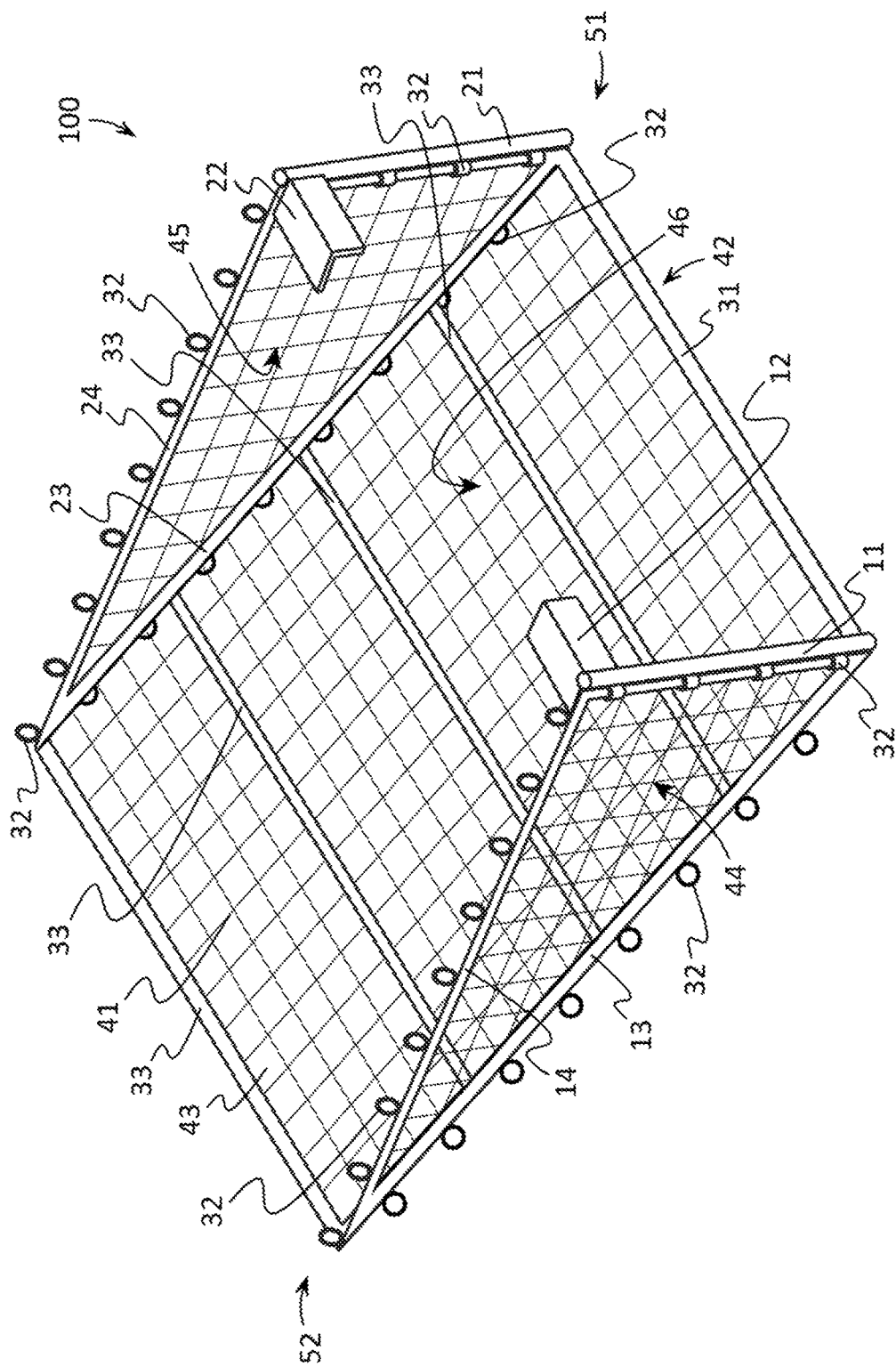
FIG. 1 depicts a top perspective view of an example of a tire tread collection device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new tire tread catching device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-7 illustrate examples of a tire tread collection device ("the device") 100 coupled to an exemplary semi truck trailer 201 according to various embodiments. The device 100 may be used with any vehicle 200 (FIGS. 1 and 4) having a frame 204 and one or more tires 203, such as a truck trailer 201 and/or a truck tractor 202 (FIGS. 1 and 4). Typically, a truck trailer 201 may be coupled to a truck tractor 202 such as by being integrally coupled together or by being removably coupled together. It should be understood that the device 100 may be coupled to a wheeled vehicle 200 anywhere behind one or more tires 203 including behind the proximal tires 203A (FIG. 2) on a truck tractor 202 and/or behind the distal tires 203B (FIG. 2) on a truck trailer 201. The device 100 may be used and positioned to collect debris common to roadways such as tire tread thrown from a tire, highway safety cones, mufflers and other components that have fallen off vehicles and trailers, other foreign objects, and the like.

In some embodiments, the device 100 may comprise a first vertical support 11 and a second vertical support 21 which may be coupled to opposite sides of the collection aperture 42 and which may be optionally coupled to opposing sides of the vehicle 200 so that one or more tires 203 are positioned approximately between the vertical supports 11. An optional horizontal support 31 may also be coupled to the vertical supports 11, 21. Preferably, the vertical supports 11, 21, may be coupled to opposing sides of the collection aperture 42 and the horizontal support 31 may be coupled to each vertical support 11, 21, and also coupled to the bottom of the collection aperture 42 so that the shape of the collection aperture 42 and the first end 51 may be maintained by the vertical supports 11, 21, and the horizontal support 31. Additionally, one or more portions of the debris screen 41 may be coupled to the bottom of the wheeled vehicle 200, such as with one or more retainers 32, thereby maintaining the shape of the debris screen 41 and/or maintaining the distance between the first end 51 and the second end 52.

Each vertical support 11, 21, may be coupled to the vehicle 200, such as to the bottom of a truck trailer 201, with the vertical support 11 extending away from the vehicle 200 towards a ground surface. Generally, the device 100 may be coupled to and below portions of the frame 204 of the vehicle 200. In some embodiments, each vertical support 11, 21, may be coupled to the frame 204 of a vehicle 200 with one or more vehicle couplers 12, 22. In other embodiments, each vertical support 11, 21, may be coupled to the mud flap hardware 205, typically comprising an angle iron which may be used to couple a mud flap 206 to the frame 204, of a vehicle 200 with one or more vehicle couplers 12, 22. In further embodiments, a first vehicle coupler 12 may be coupled to the first vertical support 11, and the first vehicle coupler 12 may also be coupled to the frame 204 of the vehicle, optionally by being coupled to a mud flap support 205 or any other element under the frame 204. Likewise, a second vehicle coupler 22 may be coupled to the second vertical support 21, and the second vehicle coupler 22 may also be coupled to the frame 204 of the vehicle, optionally by being coupled to a mud flap support 205 or any other element under the frame 204.

A vehicle coupler 12, 22, may comprise any element or structure which may be used to couple two objects together. In preferred embodiments, a vehicle coupler 12, 22, may comprise an angle iron or the like which may be coupled to both the frame 204 of the vehicle, optionally by being coupled to a mud flap support 205 or any other element under the frame 204, and to a vertical support 11, 21. In other embodiments, a vehicle coupler 12, 22, may comprise a block of material, a triangular brace, or any other structure which may be coupled to both the frame 204 of the vehicle, optionally by being coupled to a mud flap support 205 or any other element under the frame 204, and to a vertical support 11, 21. In alternative embodiments, a vehicle coupler 12, 22, may comprise a hinged or movable/removable coupling. A vehicle coupler 12, 22, may be integrally formed with a vertical support 11, 21, and/or the frame 204 of a vehicle 200, removably coupled with a vertical support 11, 21, and/or the frame 204 of a vehicle 200 such as with nuts, bolts, or other removable fasteners, and/or relatively permanently coupled with a vertical support 11, 21, and/or the frame 204 of a vehicle 200 such as by being welded, riveted, or otherwise bonded. In still further embodiments, a vehicle coupler 12, 22, may comprise a removable fastener, a welded joint, or any other coupling method which may be used to couple a vertical support 11, 21, to the frame 204 of a vehicle 200.

Figure 2:
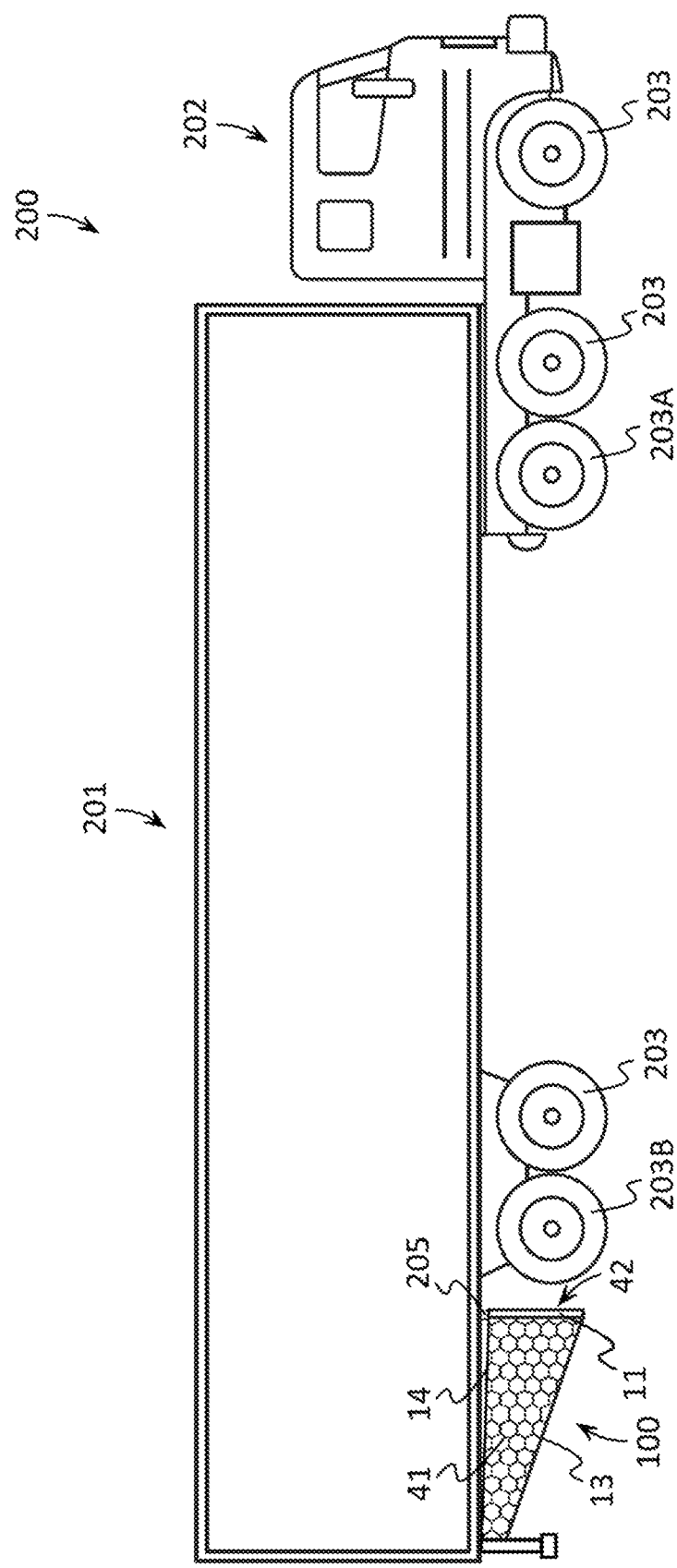
FIG. 2 illustrates a side elevation view of an example of a tire tread collection device coupled to a semi truck trailer according to various embodiments described herein.
Figure 6:
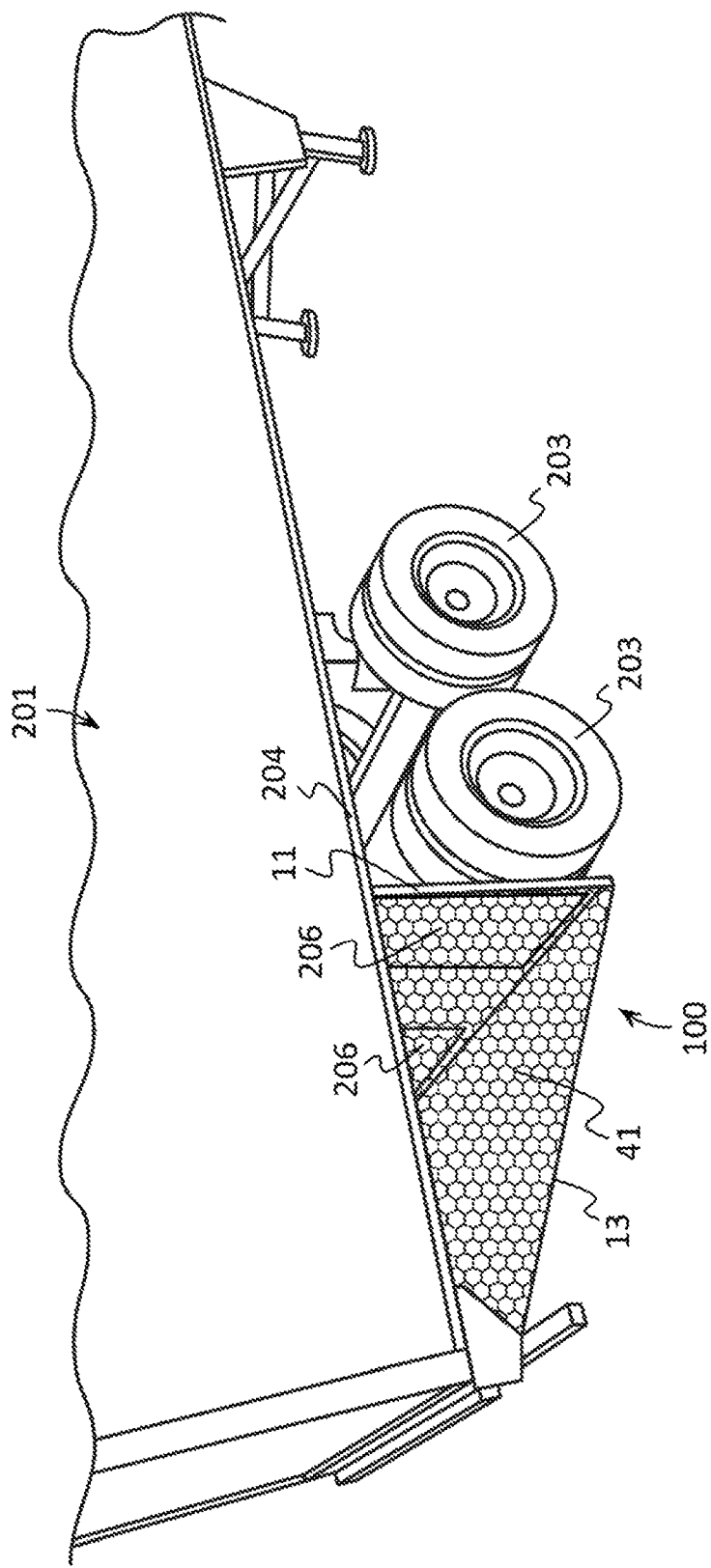
FIG. 6 shows a top perspective view of an example of a tire tread collection device coupled to a semi truck trailer according to various embodiments described herein.

In preferred embodiments and as shown in FIGS. 1, 2, and 6, the device 100 may comprise one or more vehicle couplers 12, 22, which may be exact or substantially similar angle iron copies of mud flap hardware 205 configured as angle irons. The vehicle couplers 12, 22, may fit over mud flap hardware 205 configured as angle irons in the same direction as the mud flap hardware 205. Typically, the existing mud flap hardware 205 configured as an angle iron extends 102 inches from side to side on truck trailers 201. This is the allowable width of truck trailer 201. A first vertical support 11 may be welded to the backside, on the outside trailer end, of a first vehicle coupler 12 and a second vertical support 21 may be welded to the backside, on the outside trailer end, of a second vehicle coupler 22. Each vehicle coupler 12, 22, may be bolted through or otherwise coupled to the mud flap hardware 205. Optionally, the vertical supports 11, 21 may extend vertically past the outside edge of the mud flaps 206 on both the right and left sides of the trailer 201 so that the mud flaps 206 may swing freely into the collection aperture 42 and thus able to continue to serve their function. Preferably, the second end 52 of the debris screen 41 may be secured to the underside of the truck trailer 201, such as to a tandem axle slider, with retainers 32 configured as eyebolts through the existing tandem axle slider holes and with retainers 32 configured as carabineers along the perimeter of the debris screen 41.

In preferred embodiments, a first vertical support 11 may be coupled behind a set of tires 203, such as behind the rear most tires 203, and a second vertical support 21 may also be coupled behind the set of tires 203 with the distance between the two vertical supports 11, 21, being approximately greater than or equal to the axle 207 track distance of the set of tires 203. In other embodiments, a first vertical support 11 may be coupled behind one tire 203 and a second vertical support 21 may also be coupled behind the tire 203 with the distance between the two vertical supports 11, 21, being approximately greater than or equal to the width of the tire 203. In still other embodiments, a first vertical support 11 may be coupled behind two or more tires 203 and a second vertical support 21 may also be coupled behind the two or more tires 203 with the distance between the two vertical supports 11, 21, being approximately greater than or equal to the track between the two or more tires 203.

The debris screen 41 may comprise a first end 51, having a collection aperture 42, and a second end 52. The first end 51 and collection aperture 42 may be positioned behind and proximate to one or more tires 203 of a vehicle 200. The second end 52 may extend away from the first end 51, optionally coupled to the rear end of a wheeled vehicle 200, such as to the bottom of a truck trailer 201. Tire debris may enter the debris screen 41 through the collection aperture 42 of the first end 51 and be retained therein between the first end 51, the second end 52, and the rear portions of the wheeled vehicle 200, such as the bottom of a truck trailer 201.

In preferred embodiments, a collection aperture 42 may comprise a width that is approximately greater than or equal to the width of at least one tire 203 of the vehicle 200. In further embodiments, a collection aperture 42 may comprise a width that is approximately greater than or equal than the width of all the tires 203 on an axle 207 of a vehicle 200. For example, an axle 207 typically has a set of two to four tires 203 with half the tires 203 positioned closer to the right side of the vehicle 200 and the other half of the tires 203 positioned closer to the left side of the vehicle 200. The collection aperture 42 may have a width that extends from the left side to the right side of the vehicle so that the collection aperture 42 may have a width greater than the width of the tires 203 and the space between the tires 203. In alternative embodiments, a collection aperture 42 may comprise a width that is approximately greater than or equal than the width of one or more tires 203 on one side of an axle 207 of a vehicle 200. For example, one side of an axle 207 typically has between one and two tires 203 and the collection aperture 42 may have a width approximately greater than or equal to the one or two tires 203 on the right side or the left side of the vehicle 200. In this manner, the collection aperture 42 of a first device 100 may be positioned behind the left side tires 203 and the collection aperture 42 of a second device 100 may be positioned behind the right side tires 203 of an axle 207 of a vehicle 200.

The debris screen 41 may be made of a material or combination of materials which are able to receive tire debris including tire debris that is thrown from a tire 203 at highway speeds. In preferred embodiments, the debris screen 41 may comprise one or more vents 43 which may be permeable to air and wind so as to enable air and wind to pass through the debris screen 41 thereby enabling the device 100 to generate minimal wind resistance while a vehicle 200 having the device 100 is traveling at speed.

In some embodiments, a debris screen 41 may comprise a flexible netting material which may be generally flexible and have a plurality of vents 43. A flexible netting material may include various types and styles of plastic and/or metal wire, mesh netting such as nylon netting, tarred nylon netting, polyester barrier mesh, polyester debris fabric, Textilene mesh, vinyl coated mesh, chain link fencing, wire fencing, chain netting, chain mesh, metal screen, braided steel wire, plastic screen, fabric screen, or any other netting or fencing material including netting commonly used for fishing industries and/or sporting equipment or purposes. In alternative embodiments, the debris screen 41 may be made of a generally rigid cage design with a plurality of slats, bars, or the like, which may be spaced apart to form one, two, three, four, five, six, seven, or more, such as a plurality, of vents 43 to allow air and wind to pass through the generally rigid debris screen 41 while preventing tire debris from passing through.

In some embodiments, a debris screen 41 may comprise a generally triangular prism shape having a first vertical panel 44, a second vertical panel 45, and a horizontal panel 46. Preferably, a first vertical panel 44 and a second vertical panel 45 may each comprise a similar triangular shape and the horizontal panel 46 may comprise a rectangular shape which may couple the first vertical panel 44 and second vertical panel 45 together. The panels 44, 45, 46, may be coupled together with one or more retainers 32, by being coupled to the major supports 23, 33, integrally formed together, or with any other suitable method. In further embodiments, the debris screen 41 may comprise one, two, four, five, six, or more panels, of any shape or size. For example, the debris screen 41 may comprise two triangular shaped vertical panels 44, 45, a rectangular shaped horizontal panel 46, and a rectangular shaped fourth panel which may be coupled to the two triangular shaped vertical panels 44, 45, opposite the horizontal panel 46 and preferably coupled to both a first minor support 14 and a second minor support 24.

Figure 3:
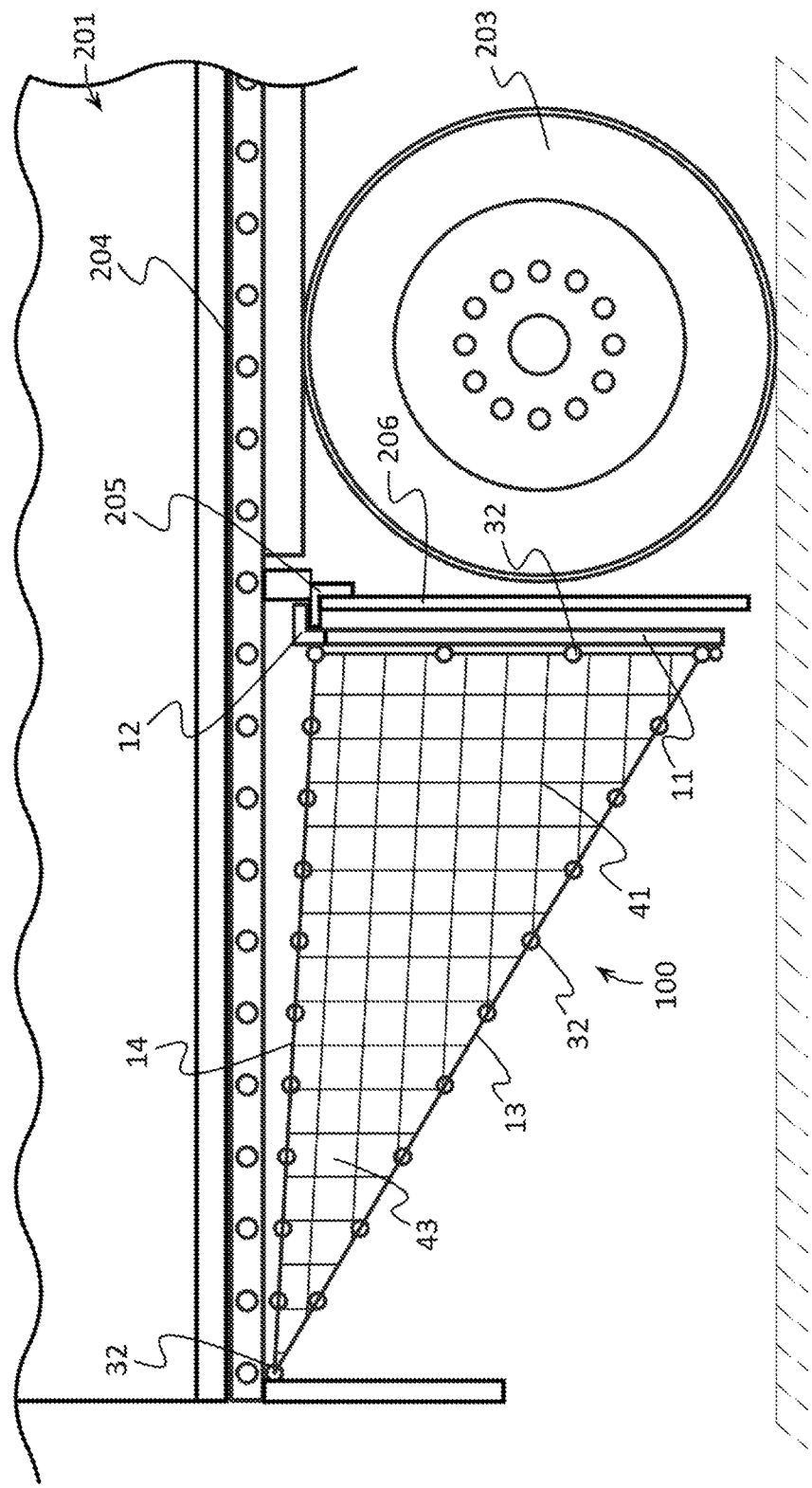
FIG. 3 shows another side elevation view of an example of a tire tread collection device coupled to a semi truck trailer according to various embodiments described herein.
Figure 4:
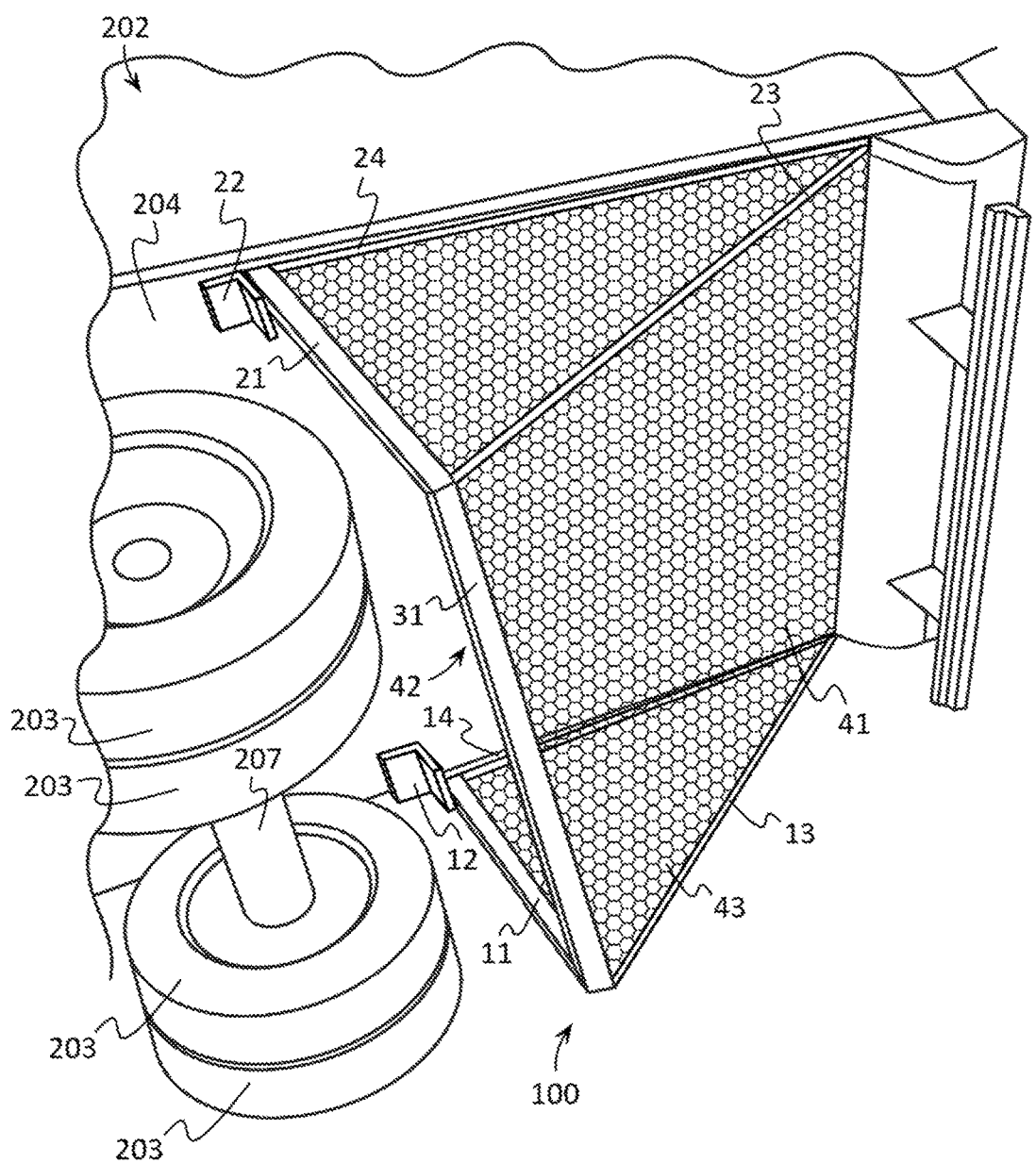
FIG. 4 depicts a bottom perspective view of an example of a tire tread collection device coupled to a semi truck trailer according to various embodiments described herein.
Figure 5:
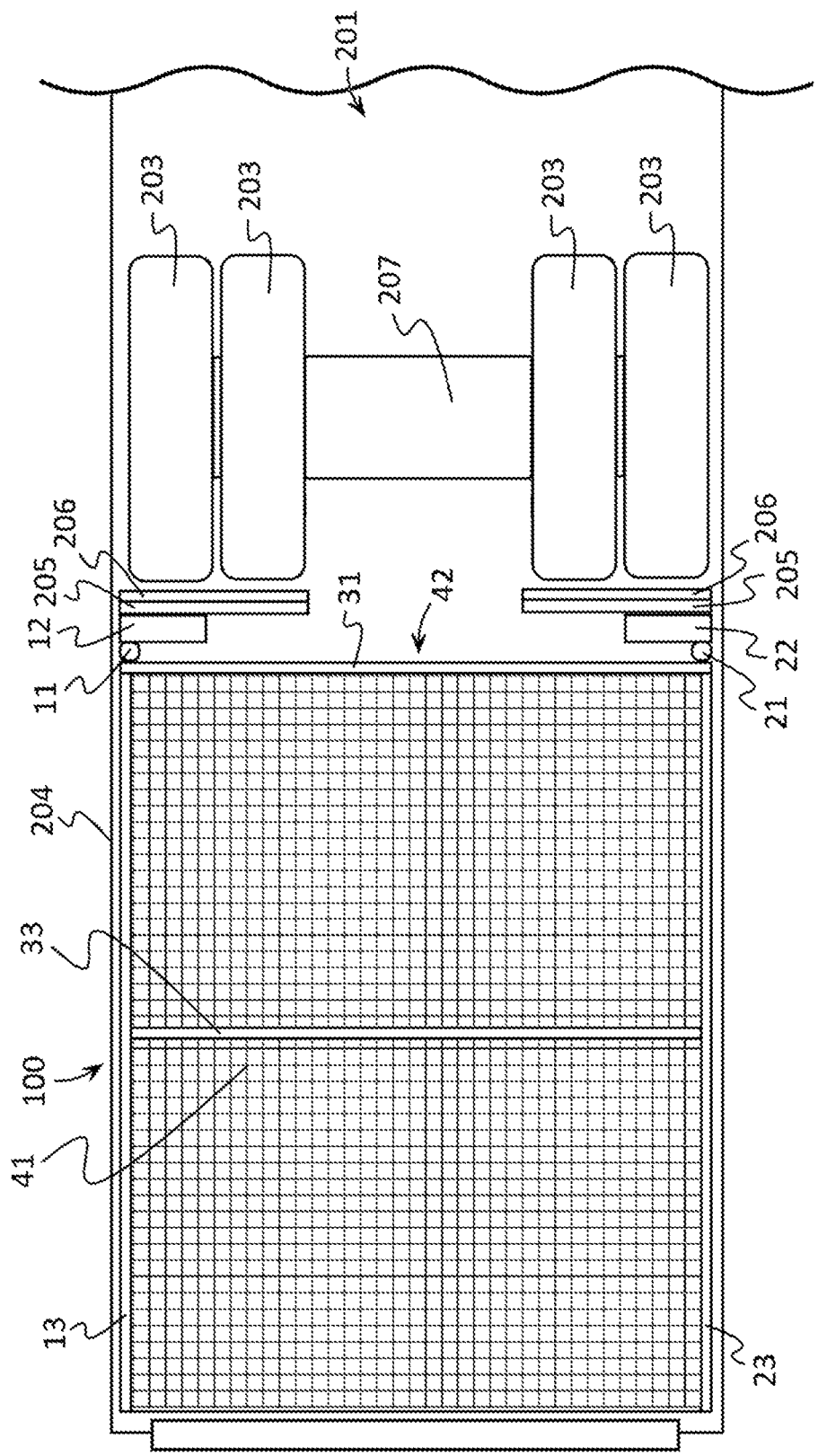
FIG. 5 illustrates a bottom plan view of an example of a tire tread collection device coupled to a semi truck trailer according to various embodiments described herein.

As perhaps best shown in FIG. 3, the first end 51 of the debris screen 41 may be coupled to one or more vertical supports 11 so that the collection aperture 42 is behind and proximate to one or more tires 203 of a vehicle 200 preferably so that the aperture 203 exceeds or is wider than both the inside surface and outside surface of the one or more tires 203. In this manner, while the vehicle 200 is moving forward, any tire debris thrown by the one or more tires 203 may travel into the collection aperture 42 to be caught within the debris screen 41.

In some embodiments, the device 100 may comprise one or more horizontal supports 31. Preferably, a first end of a horizontal support 31 may be coupled to a first vertical support 11 and a second end of the horizontal support 31 may be coupled to a second vertical support 21. In further preferred embodiments, portions of the debris screen 41 may be coupled to a horizontal support 31 so that the size and shape of the collection aperture 42 may be maintained by a horizontal support 31 and the vertical supports 11, 21. Similar to vertical supports 11, 21, horizontal supports 31 may be of any size, shape, and material that is able to resist deformation which may be caused by wind resistance and impacts with roadway and parking objects. In preferred embodiments, two or more vertical supports 11, 21, may be coupled to one or more horizontal supports 31 and to the frame vehicle 200 to form a generally rectangular shape, so that by coupling the debris screen 41 to the vertical supports 11, 21, horizontal support 31, and optionally to the frame 204 of the vehicle 200, a generally rectangular shaped collection aperture 42 may be formed.

In further embodiments, four or more vertical supports 11, 21, may be coupled to one or more horizontal supports 31 and to the vehicle 200 to form a generally triangular prism shape, so that by coupling the debris screen 41 to the supports 11, 21, and optionally to the vehicle 200, a generally quadrilateral shaped collection aperture 42 may be formed. However, it should be understood to one of ordinary skill in the art that the vertical supports 11, 21, horizontal support 31, debris screen 41, and/or collection aperture 42 may be configured in a plurality of sizes and shapes including "T" shaped, "X" shaped, square shaped, rectangular shaped, cylinder shaped, cuboid shaped, hexagonal prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention. In still further embodiments, all or portions of a vertical support 11, 21, and/or horizontal support 31 may be made of an extendable, collapsible, telescoping, or other movable or resizable assembly.

The debris screen 41 may be coupled to a vertical support 11, 21, horizontal support 31, first major support 13, first minor support 14, second major support 23, second minor support 24, and/or to a vehicle 200 with any suitable coupling method. In preferred embodiments, the debris screen 41 may be coupled to a vertical support 11, distal support 34, horizontal support 31, and/or to the frame 204 or other portions of a vehicle 200 with one or more retainers 32. In some embodiments, a retainer 32 may comprise a carbineer, D-hook, clip type fasteners, clasp type fasteners, quick release fasteners, or any other removable fastener or hardware. In further embodiments, one or more retainers 32 may be configured to removably couple the debris screen 41 to the frame 204 of a vehicle 200. In other embodiments, a retainer 32 may comprise a threaded fastener, a magnetic fastener, a rivet fastener, locking fastener, or any other fastener suitable for coupling portions of the debris screen 41 to vertical support 11, 21, horizontal support 31, and/or to a vehicle 200.

In other embodiments, the debris screen 41 may be coupled to a vertical support 11, 21, horizontal support 31, first major support 13, first minor support 14, second major support 23, second minor support 24, and/or to a vehicle 200 by having one or more of the elements threaded through one or more vents 43 of the debris screen 41. In still further embodiments, the debris screen 41 may be coupled to the vertical supports 11, 21, horizontal support 31, and frame 204 of the vehicle 200 with other portions of the debris screen 41 supported by one or more of the first major support 13, first minor support 14, second major support 23, and/or second minor support 24.

In still other embodiments, the debris screen 41 may be coupled to a vertical support 11, 21, horizontal support 31, and/or to a vehicle 200 with a cable which may band the elements similar to a tennis net headband, having a cable coupled therein, and the cable may be inserted through light weight perforated metal square pipe which may form all or portions of a vertical support 11, distal support 34, and horizontal support 31. In alternative embodiments, any other preferably light weight and aero dynamic coupling method may be used to maintain size and shape of the collection aperture 42 so that tire debris may be caught by the collection aperture 42.

In some embodiments, the device 100 may comprise one or more major supports, such as a first major support 13 and a second major support 23. A first major support 13 may be coupled to a portion of the first vertical support 11, such as to a bottom portion of the first vertical support 11. Optionally, the first major support 13 may be coupled to the debris screen 41. Optionally, the first major support 13 may be coupled to the vehicle 200, such as to the frame 204 of the vehicle 200. Similarly, a second major support 23 may be coupled to a portion of the second vertical support 21, such as to a bottom portion of the second vertical support 21. Optionally, the second major support 23 may be coupled to the debris screen 41. Optionally, the second major support 23 may be coupled to the vehicle 200, such as to the frame 204 of the vehicle 200.

In some embodiments, the device 100 may comprise one or more minor supports, such as a first minor support 14 and a second minor support 24. A first minor support 14 may be coupled to a portion of the first vertical support 11, such as to a top portion of the first vertical support 11. Optionally, the first minor support 14 may be coupled to the debris screen 41. Optionally, the first minor support 14 may be coupled to the vehicle 200, such as to the frame 204 of the vehicle 200. Similarly, a second minor support 24 may be coupled to a portion of the second vertical support 21, such as to a top portion of the second vertical support 21. Optionally, the second minor support 24 may be coupled to the debris screen 41. Optionally, the second minor support 24 may be coupled to the vehicle 200, such as to the frame 204 of the vehicle 200.

In some embodiments, a first vertical support 11, first major support 13, and first minor support 14, may be coupled together to form a generally triangular shape. In other embodiments, one or more first vertical supports 11, first major supports 13, and/or first minor supports 14, may be coupled together to form any other shape or configuration. Likewise, in some embodiments, a second vertical support 21, second major support 23, and second minor support 24, may be coupled together to form a generally triangular shape. In other embodiments, one or more second vertical supports 21, second major supports 23, and/or second minor supports 24, may be coupled together to form any other shape or configuration.

In some embodiments, the device 100 may comprise one or more braces 33 which may be coupled to any other elements of the device 100 to provide structural rigidity to the elements. In some embodiments, one or more braces 33 may be coupled to both a first major support 13 and a second major support 23. In further embodiments, one or more braces 33 may be coupled to both a first major support 13 and a first minor support 14, and/or one or more braces 33 may be coupled to both a second major support 23 and a second minor support 24. In still further embodiments, one or more braces 33 may be coupled to both a first minor support 14 and a second minor support 24.

Vertical supports 11, 21, first major supports 13, first minor supports 14, second major supports 23, second minor supports 24, horizontal supports 31, braces 33, and distal supports 37 (FIG. 7) may be of any size, shape, and material that is able to resist deformation which may be caused by wind resistance and impacts with roadway and parking objects. In some embodiments, one or more vertical supports 11, 21, first major supports 13, first minor supports 14, second major supports 23, second minor supports 24, horizontal supports 31, braces 33, and/or distal supports 34 may be substantially rigid and be made from a rod, bar, beam, or the like of a substantially rigid material such as steel alloys, aluminum, aluminum alloys, copper alloys, any other type of metal or metal alloy, various types of hard plastics, such as nylon, acrylic, uPVC, HDPE, melamine, hard rubbers, fiberglass, carbon fiber, resins, such as epoxy resin, or any other material including combinations of materials that are substantially rigid. In other embodiments, one or more vertical supports 11, 21, first major supports 13, first minor supports 14, second major supports 23, second minor supports 24, horizontal supports 31, braces 33, and/or distal supports 34 may be substantially flexible and be made from a chain, rope, cable, or the like of a metal alloy, plastic, or natural fibers including jute, hemp, flax, and the like.

Figure 7:
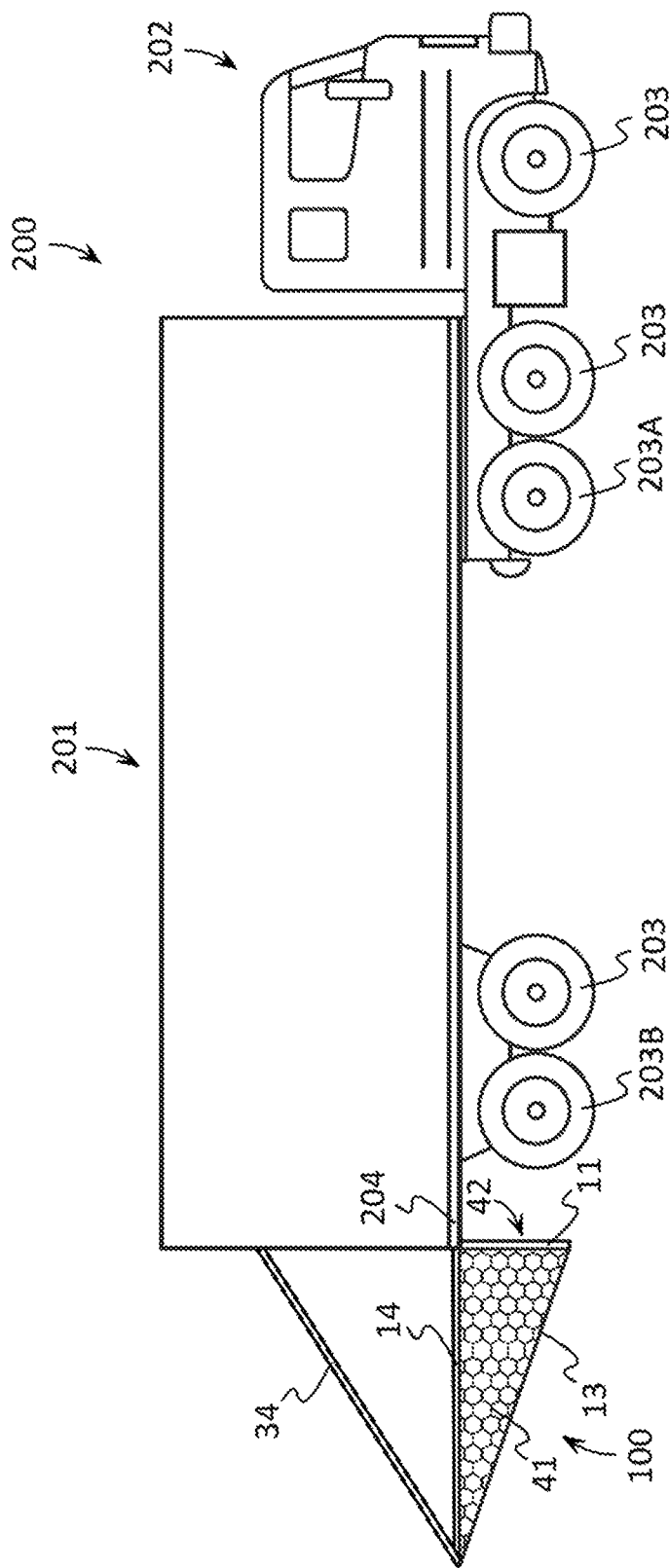
FIG. 7 depicts a side elevation view of an alternative example of a tire tread collection device coupled to a semi truck trailer according to various embodiments described herein.

As perhaps best shown in the example of FIG. 7, in some embodiments, the device 100 may comprise one or more vertical supports 11, 21, major supports 13, 23, minor supports 14, 24, and distal supports 34 which may be coupled to a debris screen 41 which may optionally extend out behind the rear end of a wheeled vehicle 200, such as behind a truck trailer 201. The size and shape of the debris screen 41, and/or the size and shape of the second end 52, may be maintained by one or more distal supports 34 which may be coupled to the vehicle 200 and to the debris screen 41, major supports 13, 23, and/or minor supports 14, 24. Similar to vertical supports 11, distal supports 34 may be of any size, shape, and material that is able to resist deformation which may be caused by wind resistance and impacts with roadway and parking objects. For example, a distal support 34 may comprise a generally rigid bar or rod or a generally flexible cable or chain.

While some materials have been provided, in other embodiments, the elements that comprise the device 100 such as a vertical support 11, 21, debris screen 41, optional distal support 34, optional horizontal support 31, optional major support 13, 23, optional minor support 14, 24, optional retainers 32, optional braces 33, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A tire tread collection device for use with a vehicle having a frame and one or more tires, the device comprising:
a first vertical support configured to be coupled to the vehicle;
a second vertical support configured to be coupled to the vehicle;
a debris screen coupled to each of the first vertical support, the second vertical support, and the frame of the vehicle, the debris screen comprising a flexible netting material; and
a collection aperture bounded by the first vertical support, the second vertical support, and the frame of the vehicle.

2. The device of claim 1, wherein the debris screen comprises a plurality of vents.

3. The device of claim 1, wherein the flexible netting material comprises mesh netting.

4. The device of claim 1, further comprising one or more retainers coupled to the debris screen.

5. The device of claim 1, wherein the debris screen comprises a first vertical panel, a second vertical panel, and a horizontal panel.

6. The device of claim 1, further comprising a first major support coupled to the first vertical support, a second major support coupled to the second vertical support, and a brace coupled to both the first major support and to the second major support.

7. The device of claim 1, further comprising a horizontal support coupled to both the first vertical support and to the second vertical support.

8. The device of claim 1, further comprising a first major support and a first minor support, wherein both the first major support and the first minor support are each coupled to the first vertical support.

9. The device of claim 8, further comprising a second major support and a second minor support, and a brace coupled to both the first major support and to the second major support, wherein both the second major support and the second minor support are each coupled to the second vertical support.

10. The device of claim 1, wherein the collection aperture has a width that is greater than the width of at least one tire of the vehicle.

11. A tire tread collection device for use with a vehicle having a frame and two tires, wherein the tires are positioned on opposite sides of the vehicle, the device comprising:
 a first vehicle coupler configured to be coupled to the vehicle;
 a first vertical support configured to be coupled to the first vehicle coupler;
 a second vehicle coupler configured to be coupled to the vehicle;
 a second vertical support configured to be coupled to the second vehicle coupler;
 a first major support coupled to the first vertical support, a second major support coupled to the second vertical support, and a brace coupled to both the first major support and to the second major support;
 a debris screen coupled to each of the first vertical support, the second vertical support, and the frame of the vehicle; and
 a collection aperture bounded by the first vertical support, the second vertical support, and the frame of the vehicle, wherein the collection aperture has a width that is greater than the width of at least one tire of the vehicle.

12. The device of claim 11, wherein the debris screen comprises a plurality of vents.

13. The device of claim 11, wherein the debris screen comprises a flexible netting material.

14. The device of claim 11, further comprising one or more retainers coupled to the debris screen.

15. The device of claim 14, wherein a retainer is configured to removably couple the debris screen to the frame of the vehicle.

16. The device of claim 11, wherein the debris screen comprises a first vertical panel, a second vertical panel, and a horizontal panel.

17. The device of claim 11, further comprising a horizontal support coupled to both the first vertical support and to the second vertical support.

18. The device of claim 11, further comprising a first major support and a first minor support, wherein both the first major support and the first minor support are each coupled to the first vertical support.

19. The device of claim 18, further comprising a second major support and a second minor support, and a brace coupled to both the first major support and to the second major support, wherein both the second major support and the second minor support are each coupled to the second vertical support.

* * * * *